UNITED STATES PATENT OFFICE.

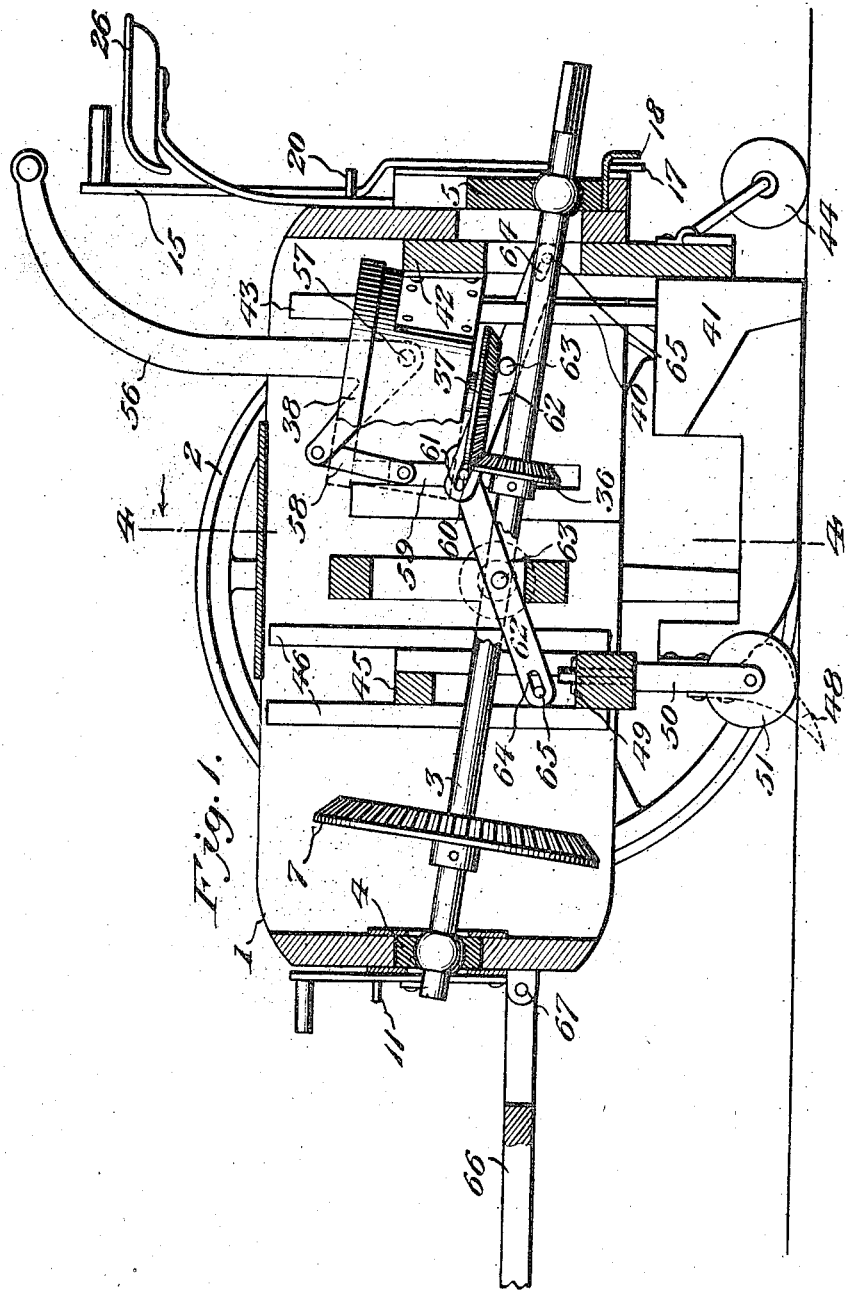
J. P. DANIEL.
PLANTER.
APPLICATION FILED MAY 6, 1918.
1,290,103.
Patented Jan. 7, 1919.
3 SHEETS—SHEET 1.

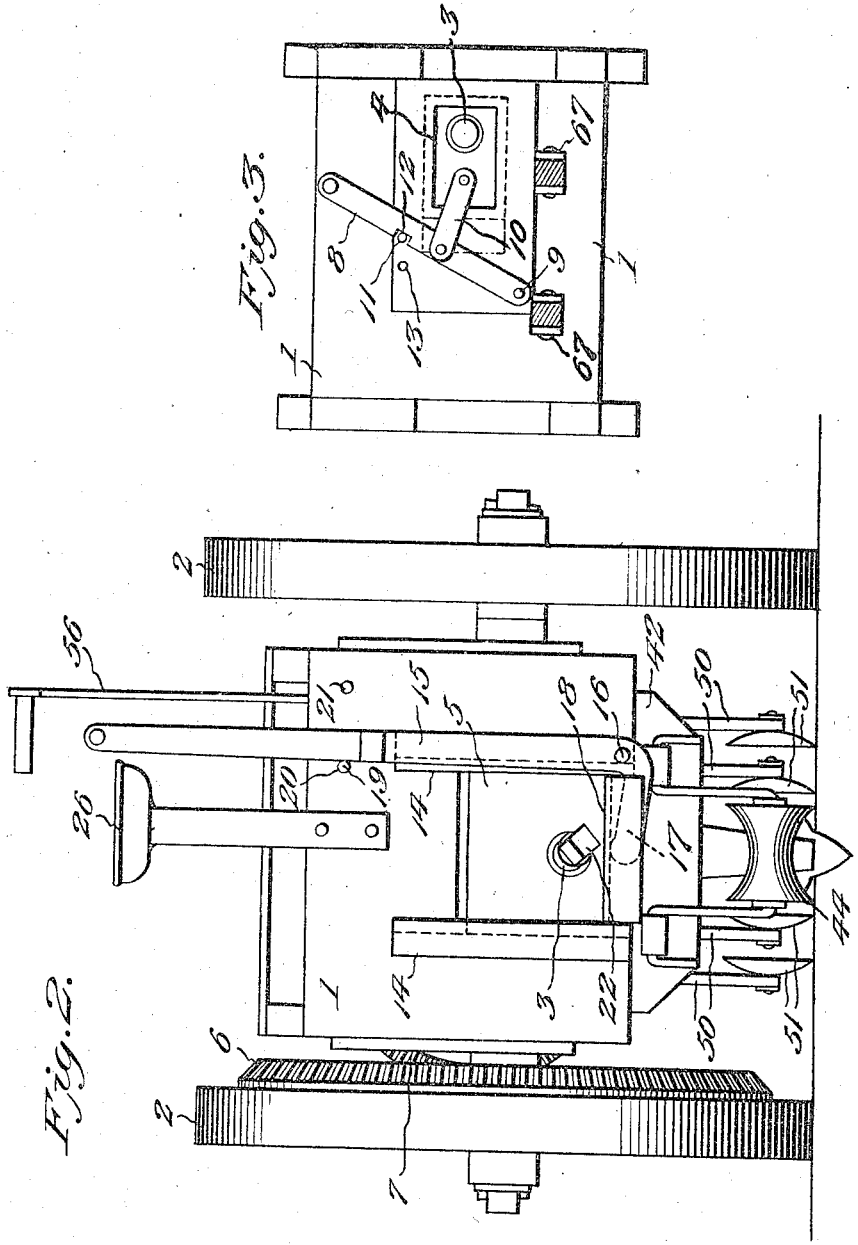

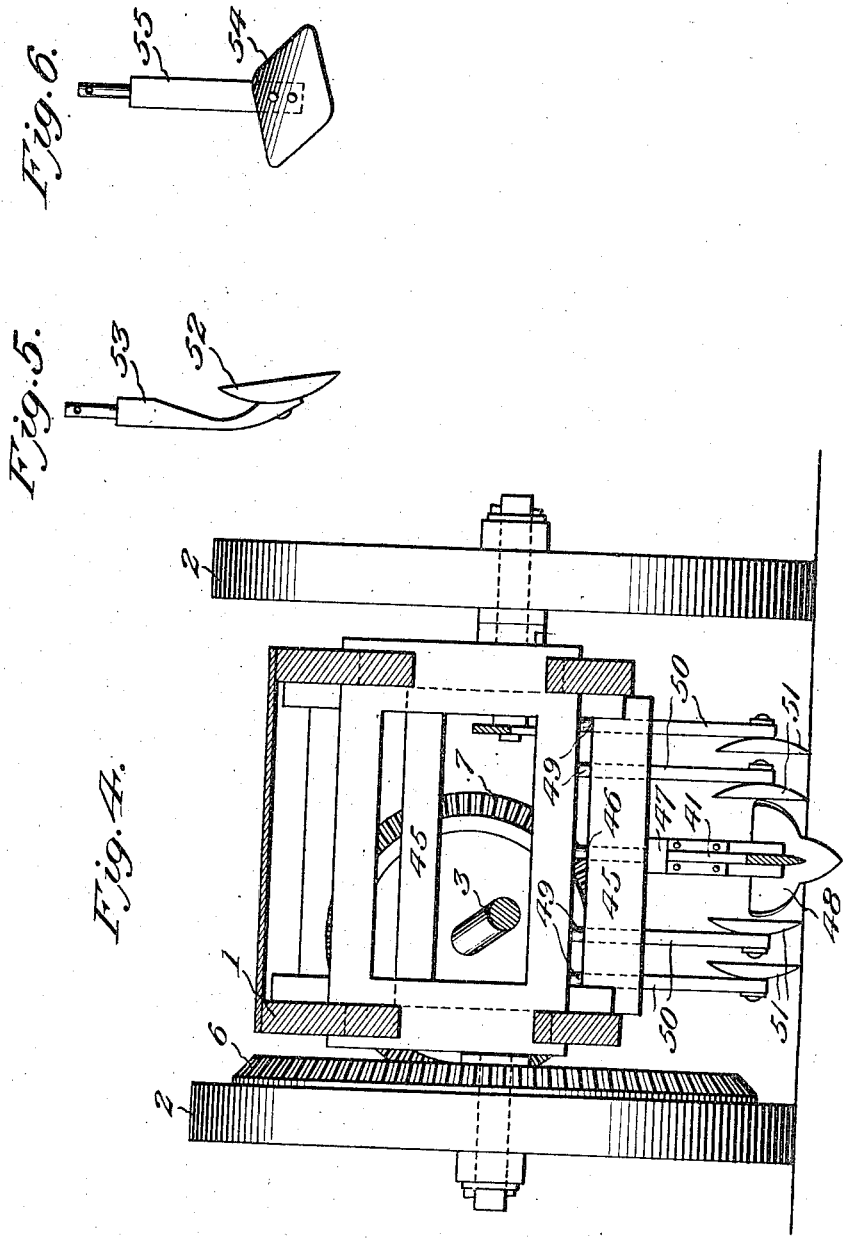

JOHN PEYTON DANIEL, OF COAHOMA, MISSISSIPPI.

PLANTER.

1,290,103.  Specification of Letters Patent.  Patented Jan. 7, 1919.

Application filed May 6, 1918. Serial No. 232,827.

*To all whom it may concern:*

Be it known that I, JOHN PEYTON DANIEL, a citizen of the United States, residing at Coahoma, county of Coahoma, and State of Mississippi, have invented certain new and useful Improvements in Planters, of which the following is a specification.

The invention contemplates improvements whereby the earth working means such as plows, disks, colters, shoe or coverer, and feed box may be raised or lowered as a unit and by such action disconnecting the feed box mechanism from the driving means.

In the drawings:

Figure 1 is a longitudinal section through the machine, the shoe, cover, plow and colters all being shown in position;

Fig. 2 a rear elevation;

Fig. 3 a detail elevation of the means for shifting the main shaft laterally;

Fig. 4 a section on line 4—4 Fig. 1;

Fig. 5 a detail of a disk which may be used; and

Fig. 6 a similar view of a shovel.

The frame 1 is carried by ground wheels 2. Extending in a general longitudinal direction in relation to the frame is a main shaft 3 which is mounted in a laterally shiftable journal box 4 at its forward end and in a vertical shiftable journal box 5 at its rearward end. The mounting of the shaft in the respective boxes 4 and 5 is sufficiently loose to permit lateral movement with the box 4 and vertical movement with the box 5 without binding in either of them. Special bearings to accommodate these movements, may be provided.

One of the wheels 2 has gear teeth 6 adapted to mesh with a gear 7 on shaft 3 whereby the mechanisms of the machine are driven, as the machine advances, but by shifting the box 4 in a lateral direction, the gear 7 will be thrown out of mesh with the teeth 6 so that the mechanisms will not operate. When going to, or returning from, the field or place where the machine is to be used, it is undesirable for the mechanisms to operate and thus this condition may be taken care of. To shift the box 4 I provide a lever 8 pivoted at 9 to frame 1 and connected by a link 10 to the box 4. A removable pin 11 which may be placed in either one of the holes 12, 13, holds the lever 8 in one position or the other, with the gear 7 in or out of mesh with the teeth 6.

The rear box 5 operates in guides 14 and is raised or lowered by a lever 15 pivoted at 16 and having an arm 17 adapted to bear against the member 18 on the box 5. A stop pin 19 insertible in holes 20, 21, is employed to hold the lever 15 in one position or the other to maintain the box 5 in raised or lowered position.

The shaft 3 carries a gear wheel 36 which meshes with a gear 37 on the bottom of feed box 38, the latter having feeding devices 39 and being suitably constructed for the feeding of the seed into a tube 40 leading to the shoe 41. The feed box is carried by a vertically movable slide 42 operating in guides 43 on the frame 1. The shoe 41 is connected to the slide 42. A suitable coverer 44 is carried by the slide 42 at the rear of the shoe 41. Another slide 45 is adapted to move vertically in guides 46 on the frame 1 and there is detachably secured thereto by a fastening 46, the shank 47 of a plow or crust breaker 48. The forward end of the shoe 41 is connected to the shank 47. Detachably secured by fastenings 49 on the slide 45 are the shanks 50 of colters 51. The colters may be removed and disks 52 having shanks 53 (Fig. 5) may be substituted for certain operations. Similarly, shovels 54 carried by shanks 55 may be substituted and secured by the fastenings 49, these shovels being shown in Fig. 6. Means are thus provided for any desired treatment of the crust or earth.

The slides 42 and 45 and the mechanisms carried thereby, including the shoe 41, feed box 38, and earth treating devices which may be carried by the slide 45, are adapted for simultaneous elevation or depression by the operation of a lever 56 pivoted at 57 and connected by a link 58 to a slide 59 which has a pin 60 received in the slot 61 by levers 62 pivoted at 63 and provided with slots 64 receiving pins 65 on the slides 42 and 45.

For the purpose of drawing the machine along there is provided a tongue 66 pivoted to the frame 1 at 67.

When the lever 56 is manipulated to raise the shoe, coverer, crust breaker, etc., as when going to, or returning from, work, the feed box is thrown out of mesh and consequently no feeding of the seed occurs.

Modifications may be resorted to, such as substituting any well known or preferred latching means for holding the levers in any desired positions, adding extra holes for the accommodation of the standards of additional shovels, within the spirit of the invention.

Having thus described my invention, what I claim as new and desire to secure by Letters Patent is:—

1. In an agricultural machine, the combination with a main frame, of a pair of slides mounted for up and down movement thereon, earth-working devices attached to, and bodily movable with, said slides, a feed box attached to, and bodily movable up and down with, one of said slides, levers pivoted to the frame, each having one end operatively connected with one of the slides, and operating means connected to the other ends of said levers adapted for jointly moving them to jointly raise or lower the aforesaid slides.

2. In an agricultural machine, the combination with a main frame of a pair of slides mounted for up and down movement thereon, earth-working devices attached to, and bodily movable with, said slides, a feed box attached to, and bodily movable up and down with, one of said slides, levers pivoted to the frame having slot-and-bolt connections with the respective slides, operating means having a slot-and-bolt connection with said levers adapted for jointly moving them to jointly raise or lower the aforesaid slides, and driving gearing for said feed box which is disengaged when the feed box is elevated, to prevent feeding when the aforesaid elements are in raised position.

In testimony whereof, I hereunto affix my signature.

J. P. DANIEL.

Copies of this patent may be obtained for five cents each, by addressing the "Commissioner of Patents, Washington, D. C."